(12) United States Patent
Suzuki

(10) Patent No.: US 9,965,373 B2
(45) Date of Patent: May 8, 2018

(54) MONITORING METHOD AND COMPUTER DEVICE

(71) Applicant: FUJI ELECTRIC CO., LTD., Kawasaki (JP)

(72) Inventor: Tetsuo Suzuki, Hamura (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 385 days.

(21) Appl. No.: 14/820,172

(22) Filed: Aug. 6, 2015

(65) Prior Publication Data

US 2015/0339208 A1    Nov. 26, 2015

Related U.S. Application Data

(63) Continuation of application No. PCT/JP2014/064183, filed on May 28, 2014.

(30) Foreign Application Priority Data

Aug. 7, 2013  (JP) .................................. 2013-164011

(51) Int. Cl.
*G06F 11/34* (2006.01)
*G06F 11/30* (2006.01)

(52) U.S. Cl.
CPC .......... *G06F 11/3419* (2013.01); *G06F 11/30* (2013.01); *G06F 11/3024* (2013.01);
(Continued)

(58) Field of Classification Search
CPC ................................................. G06F 11/3419
See application file for complete search history.

(56) References Cited

U.S. PATENT DOCUMENTS 7,979,870 B1   7/2011  Pulsipher
8,700,956 B2   4/2014  Asada et al.
(Continued)

FOREIGN PATENT DOCUMENTS

CN   102591758 A   7/2012
JP   3-102430      4/1991
(Continued)

OTHER PUBLICATIONS

Chinese Office Action dated Feb. 4, 2017 in corresponding Chinese Patent Application No. 201480008912.1.
(Continued)

*Primary Examiner* — Yu-Hsi D Sun

(57) ABSTRACT

In a method of monitoring processing load, every time a computer device executes each of a plurality of processes, for the interrupt of each of which a priority level is specified in advance, the computer device is caused to measure an index representing the processing load of each process, store the latest measurement value for each priority level, and update the maximum value with the latest measurement value when the latest measurement value exceeds the maximum value measured thus far. Further, with the reception from a host controller of a measurement result transmission request requesting transmission of the latest measurement value as a trigger, the computer device transmits the latest measurement value and maximum value at that time to the host controller, and the host controller stores the latest measurement value and maximum value transmitted from the computer device in a storage device.

20 Claims, 5 Drawing Sheets

(52) U.S. Cl.
CPC .......... *G06F 11/34* (2013.01); *G06F 11/3433* (2013.01); *G06F 2201/81* (2013.01)

(56) References Cited

U.S. PATENT DOCUMENTS

| | | |
|---|---|---|
| 2003/0187612 A1 | 10/2003 | Miyake |
| 2006/0150029 A1 | 7/2006 | Nakamura et al. |
| 2008/0263073 A1* | 10/2008 | Ohba .................. G06F 11/3419 |
| 2012/0170569 A1 | 7/2012 | Al-Khudairi |

FOREIGN PATENT DOCUMENTS

| | | |
|---|---|---|
| JP | 5-151004 | 6/1993 |
| JP | 2002-318713 | 10/2002 |
| JP | 2003-288237 | 10/2003 |
| JP | 2006-190109 | 7/2006 |

OTHER PUBLICATIONS

International Search Report dated Aug. 12, 2014, in corresponding International Application No. PCT/JP2014/064183.
European Search Report dated May 19, 2017 in corresponding European Patent Application No. 14835130.7.

\* cited by examiner

FIG.3

| PRIORITY LEVEL (INTERRUPT LEVEL) | PROCESS CATEGORY | MOMENTARY VALUE | MAXIMUM VALUE | OPERATIONAL STATE DATA |
|---|---|---|---|---|
| L5 | CUSTOMIZED UNIT | 0.375 | 0.375 | DATA 1 |
| L6 | CUSTOMIZED UNIT | 25.575 | 27.95 | DATA 2 |
| L7 | CUSTOMIZED UNIT | 11.9 | 12.4 | DATA 3 |
| L1 | CORE UNIT | 5.6 | 6.4 | DATA 4 |
| L4 | CORE UNIT | 8.3 | 8.9 | DATA 5 |

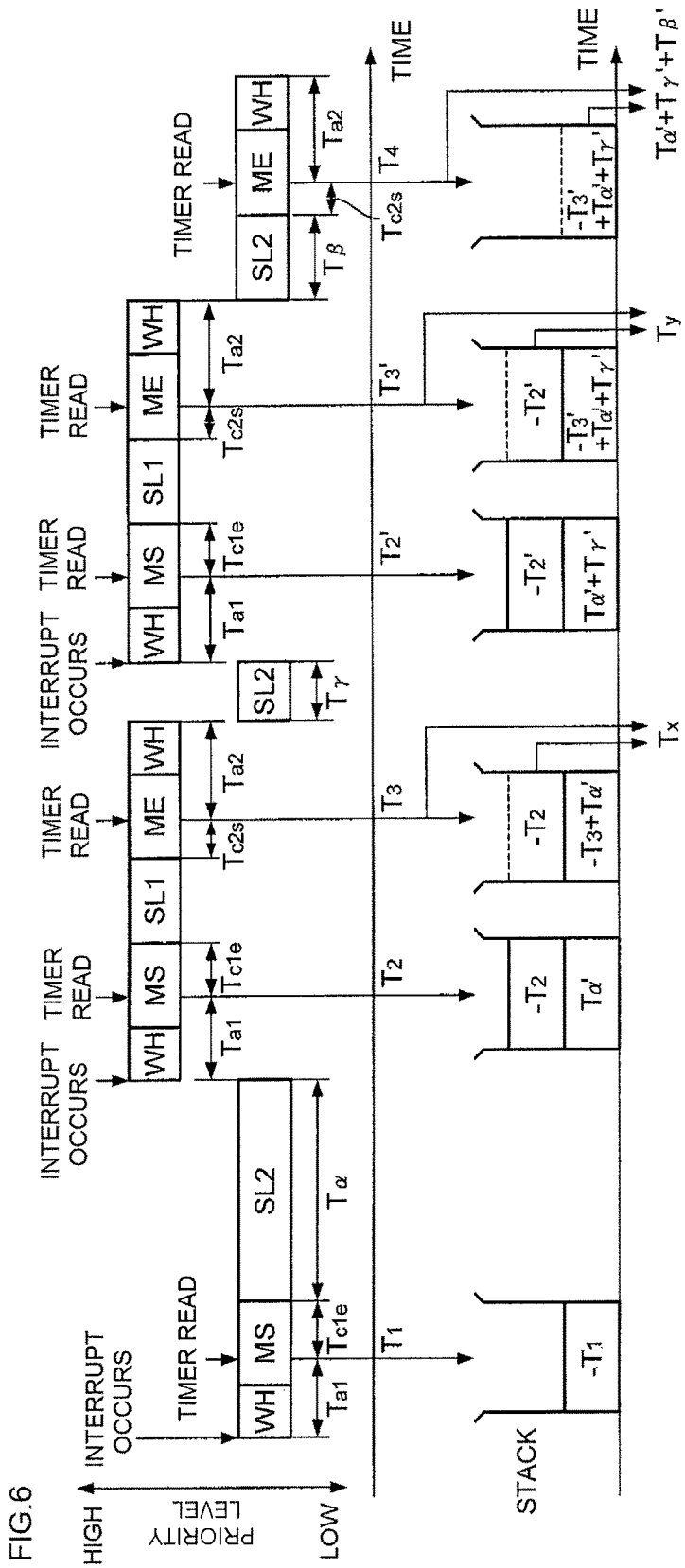

MONITORING METHOD AND COMPUTER DEVICE

CROSS-REFERENCE TO RELATED APPLICATIONS

This application is a continuation application, filed under 35 U.S.C. § 111(a), of International Application PCT/JP2014/064183 filed on May 28, 2014, and claims benefit of foreign priority of Japanese Patent Application 2013-164011, filed Aug. 7, 2013, in the Japanese Patent Office, the disclosure of each of which is incorporated herein by reference.

BACKGROUND

1. Field

The present disclosure relates to technology that monitors a program execution processing load in a computer device.

2. Background Art

In recent years, electric automobile use has been spreading rapidly. Also recent is the use, in an electric automobile, of a motor such as a 3-phase alternating current motor mounted as a power source, a drive device such as an inverter, which carries out drive control of the motor, and a host controller such as a VCU (Vehicle Control Unit), which communicates with and carries out control of the drive device. The host controller generates various kinds of command values, such as a torque command, to be provided to the drive device (for example, a value such as x[Nm] indicating the physical amount of output torque) in response to an operation by a driver. The drive device regulates alternating current power to be applied to the motor in accordance with a command value provided from the host controller. Therefore, cruise control of the electric automobile is realized. Also, the host controller acquires various kinds of data (for example, data representing current values of output torque, revolution speed (number of revolutions per unit time), or the like) stored in a memory of the drive device, and also executes a process of carrying out display control of various kinds of meter based on the data. Therefore, the driver can be made aware of the state of the vehicle.

The process of regulating the power to be applied to the motor in accordance with a command value provided from the host controller is realized by operating a CPU (Central Processing Unit, hereafter control unit) of the drive device in accordance with a control program installed in advance in the drive device. Verification of whether or not the processing load of each process executed in accordance with the control program comes within an assumed range is carried out in the development process of the control program. The length of execution time of each process (in other words, the length of the time of execution of the control program by the control unit, hereafter referred to simply as "execution time"), and the CPU occupation rate wherein the execution time of each process is converted into a ratio per unit time, are included as indices representing the processing load. This is because the higher the processing load becomes, the longer the execution time, and the higher the CPU occupation rate. For example, when using the execution time of each process as an index representing the processing load, the execution time is measured for each process using a hardware timer. Processes executed by the control unit in accordance with the control program are broadly divided into fixed-cycle processes executed cyclically at constant time intervals by a timer interrupt or the like, and irregular processes executed by irregularly occurring interrupts. When an interrupt by another process with a higher priority occurs, an accurate execution time of the interrupted process cannot be measured unless the execution time of the other process is subtracted from the time measured by the hardware timer. Therefore, various technologies that enable a program execution time to be accurately measured have been proposed. One example of which is found in JP-A-2003-288237 (US 2003/187612) and is a measurement method called a "stack method".

SUMMARY

Verification of whether or not the processing load of each process comes within an assumed range is carried out in the development process of the motor control program by a testing device (for example, a personal computer or the like) that fulfils the role of the host controller connected to the drive device, and the execution time measured in accordance with the heretofore described procedure in the drive device being monitored using the testing device. However, existing processing load monitoring technology is such that only measurement values in the immediate vicinity of an index indicating the processing load of each process are displayed on the testing device, because of which there is a problem in that the person in charge of testing cannot easily ascertain a problem in the processing load of each process. That is, there is a problem in that even where there is a process whose processing load varies, it is difficult to immediately ascertain the size of the variation, and when the processing load is unexpectedly high, analysis of the cause thereof cannot be promptly carried out. It appears that this kind of problem can be resolved by increasing the capacity of the memory of the drive device, storing a time series of the measurement values, or storing data representing the operational state of the drive device in addition to the measurement values. However, as measurement of the processing load only needs to be carried out at the development or maintenance stage of the control program, memory of an unnecessarily large capacity from the perspective of actual operation is mounted in the drive device, which is wasteful and undesirable. Also, while interrupts occur in a short cycle of intervals of several tens of microseconds in the control program execution process in the drive device, the testing device operates with a longer cycle of intervals of several milliseconds, because of which there is also a problem in that a measurement result in which a problem appears is in danger of being overlooked.

Embodiments of the invention, having been contrived bearing in mind the heretofore described problems, provide technology such that, without increasing the capacity of the memory of a device that executes various kinds of process by interruption, a problem in the processing load of the processes can be reliably and easily ascertained.

In order to resolve the heretofore described problems, one embodiment of the invention is a monitoring method whereby, when causing a computer device to execute a plurality of processes, each being executed by an interrupt and a priority level of each interrupt being specified in advance, a host controller that communicates with the computer device is caused to monitor the measurement value of an index representing the processing load of each process, and is characterized by causing each of the computer device and host computer to execute the following processes. The computer device is caused to measure the index every time each of the plurality of processes is executed, store the latest measurement value for each priority level, update the maximum value with the latest measurement value when the latest measurement value exceeds the maximum value measured thus far and, with the reception from the host controller of a measurement result transmission request requesting transmission of the latest measurement value as a trigger, transmit the latest measurement value and maximum value at that time to the host controller. Meanwhile, the host controller is caused to execute a process of transmitting the measurement result transmission request to the computer device in a cycle longer than the execution cycle of the process among the plurality of processes with the longest execution cycle, and accumulating the latest measurement values and maximum values transmitted from the computer device in a storage device.

According to the monitoring method, the measurement value and maximum value of an index representing the processing load of each of the plurality of processes in the computer device are accumulated in a storage device connected to the host controller (a device functioning as a testing device), because of which there is no need to increase the capacity of the memory of the computer device. Also, by performing a statistical analysis on the measurement values and the like stored in the storage device, the size of variation in the processing load of each process, and the like, can be easily ascertained, and a problem in the processing load can be easily ascertained. The transmission cycle of the measurement result transmission request is longer than the execution cycle of the process among the plurality of processes with the longest execution cycle, but as the maximum value of the index measured between the previous transmission and the current transmission is stored on the computer device side, failure to detect an abnormality in the processing load does not occur. In this way, according to the invention, the person in charge of testing can be reliably and easily caused to ascertain a problem in the processing load of the processes without increasing the capacity of the memory of a device that executes various kinds of process by interruption. It is sufficient that the execution time or CPU occupation rate of each process is used as the index representing the processing load of each process, and sufficient that the previously mentioned stack method is employed as the execution time measurement method.

In another aspect of this disclosure, the host controller stores a threshold relating to the index specified in accordance with the priority level of the process for each of the plurality of processes, and executes a process of comparing the latest measurement value received from the computer device and the relevant threshold, and causing an output device to output a warning message in accordance with the comparison result. According to this kind of aspect, the person in charge of testing can easily ascertain an abnormality of the processing load without carrying out a detailed examination of the measurement values and maximum values accumulated in the storage device.

In another aspect of this disclosure, the computer device stores operational state data indicating the operational state at the time when updating the maximum value correlated to the new maximum value and, with a reception of the measurement result transmission request as a trigger, transmits the operational state data correlated to the maximum value together with the latest measurement value and maximum value at the time to the host controller, and the host controller causes a display device to display the latest measurement value, maximum value, and operational state data received from the computer device. According to this aspect, the cause of the occurrence of abnormality can be investigated on the basis of the operational state data.

In another aspect of this disclosure, the index is the execution time of each of the plurality of processes, and the computer device calculates the measurement value for each process by subtracting the time needed to measure the index. When the computer device is a drive device in an electric automobile, interrupts occur at short time intervals of several tens of microseconds. Accurate measurement is difficult in a device operating using this kind of high speed interrupt, even when measuring program execution time using the existing stack method. This is because the existing stack method is such that, while no consideration is given to the time needed for a measuring process, the time needed for a measuring process cannot be ignored in a device operating using high speed interrupts, due to interrupt masking and signed calculation being carried out. According to this aspect, however, the execution time (processing load) of each process in a computer device in which interrupts occur in units of several tens of microseconds can be measured accurately.

BRIEF DESCRIPTION OF THE DRAWINGS

These and/or other aspects and advantages will become apparent and more readily appreciated from the following description of the embodiments, taken in conjunction with the accompanying drawings of which:

FIG. 3 is a diagram showing an example of a data format of measurement data received by the testing device 10 from the drive device 20.

FIG. 6 is a diagram for describing execution time measurement in the drive device

DESCRIPTION OF EMBODIMENTS

Figure 1:
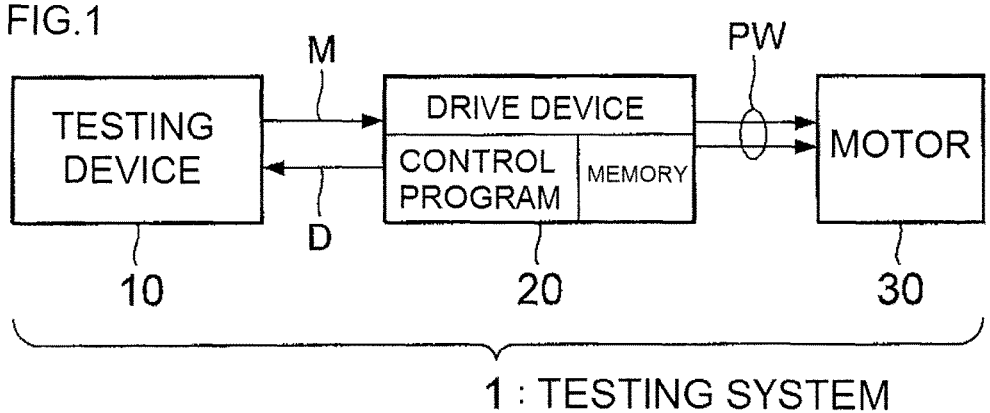
FIG. 1 is a diagram showing a configuration example of a testing system 1 including a testing system 10 and drive device 20 of an embodiment of the invention.

Hereafter, while referring to the drawings, a description will be given of an embodiment of the invention.
(A: Configuration)
(A1: System Configuration)

FIG. 1 is a diagram showing a configuration example of a testing system 1 including a drive device 20, which is an embodiment of the computer device. The drive device 20 is, for example, an inverter, and is mounted together with a motor 30 in an electric automobile. The testing system 1 shown in FIG. 1 is a computer system for carrying out various kinds of tests in a maintenance inspection or development process of the drive device 20.

As shown in FIG. 1, the testing system 1 includes a testing device 10 in addition to the testing target drive device 20 and motor 30. The testing device 10 is, for example, a personal computer, and is connected to the drive device 20 via a signal line such as a twisted pair cable. The testing device 10 provides the drive device 20 with various kinds of command M via the signal line, and receives various kinds of data D transmitted from the drive device 20 via the signal line. In the embodiment, testing of the drive device 20 is implemented by observing what kind of change occurs in the operation of the motor 30 in response to the command M provided to the drive device 20 from the testing device 10, and confirming the data D returned from the drive device 20 using the testing device 10.

The drive device 20 converts direct current power supplied from a direct current power source such as a vehicle-mounted battery (omitted from FIG. 1) into alternating current power PW, and applies the alternating current power PW to the motor 30. The drive device 20 includes a control unit (omitted from the drawing), which executes a pre-installed control program, and a memory used as a work area when executing the control program. In the embodiment, a process of controlling the alternating current power PW applied to the motor 30 in response to the various kinds of command M provided from the host controller (the testing device 10 in the embodiment, a VCU when actually operating the drive device 20 and motor 30) is realized by causing the control unit to execute the control program.

In the drive device 20, the execution times of various kinds of process executed in accordance with the control program are measured using the previously mentioned stack method of measuring. Execution times measured in this way are utilized as indices representing the processing loads of the various kinds of process executed in accordance with the control program. A person in charge of testing who carries out testing of the drive device 20 can monitor whether or not the measurement results come within an assumed range using the testing device 10. In addition, in the embodiment, the person in charge of testing can easily ascertain a problem relating to the execution times of the various kinds of process (a process is taking longer than expected, or the like) by adapting the configurations and operations of the drive device 20 and testing device 10. Hereafter, a description will be given centered on the testing device 10 and drive device 20, which markedly manifest the characteristics of the embodiment.

(A-2: Configuration of Testing Device 10)

Figure 2:
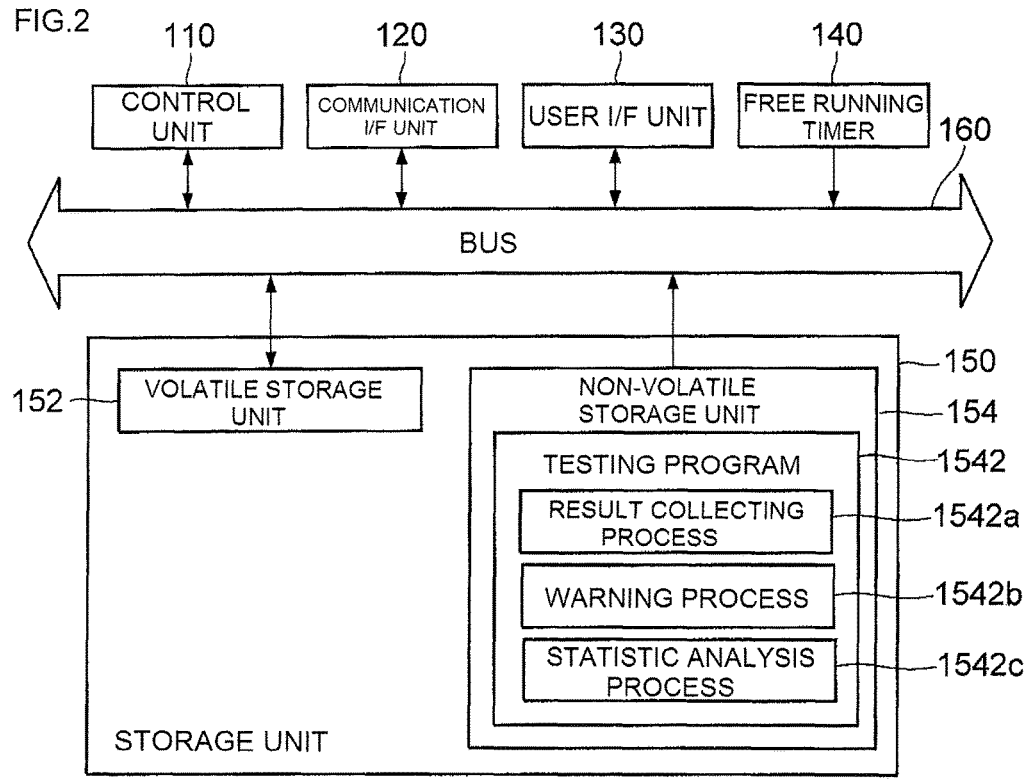
FIG. 2 is a diagram showing a configuration example of the testing device 10.

FIG. 2 is a diagram showing a configuration example of the testing device 10. The testing device 10 shown in FIG. 2 includes a control unit 110, a communication interface (abbreviated to "I/F" in FIG. 2, the same applying in the specification) unit 120, a user I/F unit 130, a free running timer 140, a storage unit 150, and a bus 160 that mediates an exchange of data among these components.

The control unit 110 is, for example, a CPU. The control unit 110 functions as a control center of the testing device 10 by executing a testing program 1542 stored in the storage unit 150 (more precisely, a non-volatile storage unit 154). Processes executed by the control unit 110 in accordance with the testing program 1542 will be clarified hereafter.

The communication I/F unit 120 is, for example, an NIC (Network Interface Card), and is connected to the drive device 20 via a communication line. The communication I/F unit 120 provides the drive device 20 with the various kinds of command M provided from the control unit 110 via the communication line, and also receives the various kinds of data D transmitted from the drive device 20 via the communication line, and provides the control unit 110 with the data D. The user I/F unit 130 includes a display unit and an operation unit (omitted from FIG. 2). The display unit includes, for example, a liquid crystal display and a drive circuit thereof. The display unit, under control of the control unit 110, displays various kinds of user interface screens for allowing the person in charge of testing to perform testing of the drive device 20. A screen for allowing the person in charge of testing to specify an operation mode of the motor 30 (a specified torque mode, specified speed mode, or the like), a screen for allowing the person in charge of testing to specify the torque or revolution speed of the motor 30, a screen that displays the current values of the output torque and revolution speed of the motor 30, and the like, are included as examples of user interface screens displayed in the display unit. The operation unit includes, for example, a pointing device such as a mouse and a keyboard. The operation unit delivers data in accordance with an operation performed on the pointing device or keyboard to the control unit 110. Therefore, the details of an operation by the person in charge of testing are transmitted to the control unit 110. The free running timer 140 is a hardware timer. The free running timer 140 is utilized in various kinds of timing process.

The storage unit 150 includes a volatile storage unit 152 and the non-volatile storage unit 154. The volatile storage unit 152 is, for example, a RAM (Random Access Memory). The volatile storage unit 152 is utilized by the control unit 110 as a work area when executing the testing program 1542. The non-volatile storage unit 154 is a non-volatile memory whose data are rewritable, such as, for example, a hard disk. As shown in FIG. 2, the testing program 1542 is stored in the non-volatile storage unit 154. The testing program 1542 is a program for causing the control unit 110 to execute a result collecting process 1542*a*, a warning process 1542*b*, and a statistic analysis process 1542*c* of FIG. 2.

The result collecting process 1542*a* is a process of cyclically acquiring, and accumulating in the non-volatile storage unit 154, a momentary value and maximum value of an index (in the embodiment, the execution time of each process) representing the processing load of each process in the drive device 20, and operational state data representing the operational state of the drive device 20 at the point at which the maximum value is measured, at constant time intervals. Herein, the momentary value refers to the latest measurement value of the index at each data acquisition timing occurring at the constant time intervals. Also, the maximum value refers to the maximum value of the index in a time period going back the constant time from a data acquisition timing (that is, a time period to the previous data acquisition timing). Further, the operational state data refers to data representing the operation mode of the drive device 20 (whether the operation mode is a specified torque mode or a specified speed mode), the specified values and current values of the torque and revolution speed, and the like.

The result collecting process 1542*a* is such that the control unit 110 cyclically transmits at constant time intervals a communication message (hereafter, a measurement result transmission request) requesting a transmission of the momentary value and the like via the communication I/F unit 120. As previously mentioned, fixed-cycle processes and irregular processes are executed by interruption at short time intervals of units of several tens of microseconds in the drive device 20, but the testing device 10, being a general personal computer, is a device wherein interrupts occur in a longer cycle (a cycle of units of several milliseconds). Therefore, the interval at which the data acquisition timing comes round is also of units of several milliseconds, which is a time interval sufficiently longer than the execution intervals of the various kinds of process in the drive device 20.

Although the details will be described hereafter, every time a measurement result transmission request is received, the drive device 20 returns measurement data including the momentary value and maximum value of the execution time of each process measured since the time of the previous reception and operational state data (refer to FIG. 3). As shown in FIG. 3, the measurement data are data wherein the momentary value and maximum value of the execution time of each process, and the operational state data, are categorized by the kind of process (two kinds in the example shown in FIG. 3, a customized unit and a core unit) and priority level (five kinds in the example shown in FIG. 3, levels L1 and L4 to L7). The kinds and priority levels of the processes executed in the drive device 20 will be clarified in a description of the drive device 20. The control unit 110 receives the measurement data returned from the drive device 20 in this way via the communication I/F unit 120, and sequentially writes the data in the order received into a predetermined storage region of the non-volatile storage unit 154.

The warning process 1542b is a process of causing a warning message to be displayed in the display unit when the most recent momentary value (or maximum value) acquired by the result collecting process 1542a exceeds a pre-specified threshold. It is sufficient that the threshold is specified as appropriate for each kind and each priority level of the processes executed in the drive device 20. For example, an upper limit of the execution time is pre-specified for each kind and each priority level of the processes executed in the drive device 20, and the threshold is specified as a ratio (for example, a percentage) of the upper limit. Also, the number of thresholds specified for each kind and each priority level of the processes executed in the drive device 20 not being limited to one, multiple thresholds of mutually differing sizes may be specified.

For example, when specifying the threshold as a ratio of the upper limit of the execution time, values equivalent to 50%, 70%, and 90% of the upper limit are specified as thresholds. Further, it is sufficient that when the momentary value (or maximum value) acquired by the result collecting process 1542a is less than 50% of the upper limit, a message indicating a normal operational state is displayed in the display unit, when the value is 50% or more and less than 70% of the upper limit, a message calling for attention is displayed in the display unit, when the value is 70% or more and less than 90% of the upper limit, a message to the effect that an abnormality has occurred is displayed in the display unit, and when the value is 90% or more, a message instructing that the drive device 20 is to be stopped is displayed in the display unit.

Figure 4A:
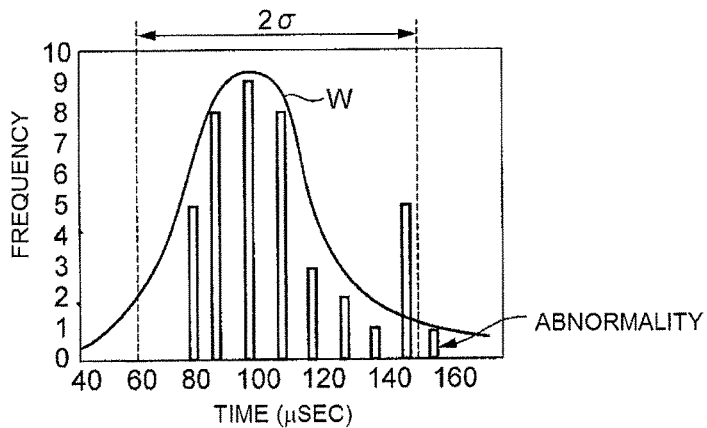
FIGS. 4A, 4B, and 4C are diagrams for describing a statistic analysis process 1542c executed by a control unit 110 of the testing device 10.
Figure 4B:
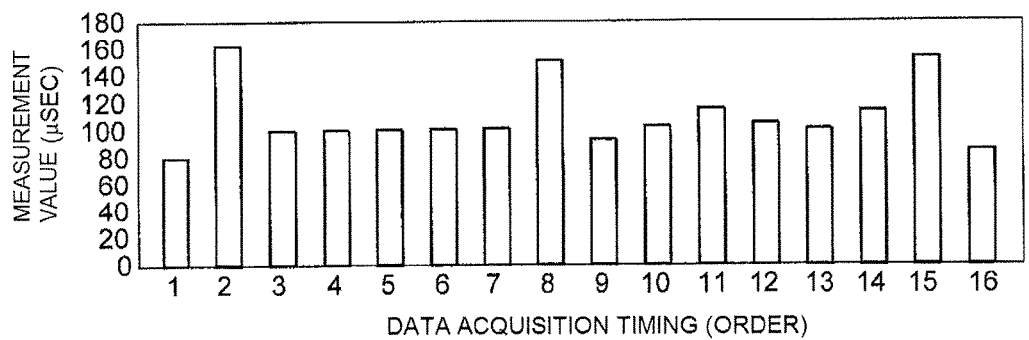

The statistic analysis process 1542c is a process of performing a statistical analysis on measurement data accumulated in the non-volatile storage unit 154, and causing an image indicating the result of the analysis to be displayed in the display unit of the user I/F unit 130. With regard to specific details of the statistical analysis, various aspects are possible. For example, calculating the average value and standard deviation of the momentary values of the execution times of processes executed in the drive device 20 for each kind and each priority level of process, calculating the frequency distribution for the occurrence rate of each momentary value in multiple pre-specified time periods, and causing the frequency distribution to be displayed in the display unit in the histogram format shown in FIG. 4A, arranging and displaying the momentary values at each data acquisition timing in the order acquired (that is, in time-series order), as shown in FIG. 4B, and the like, are possible.

Figure 4C:
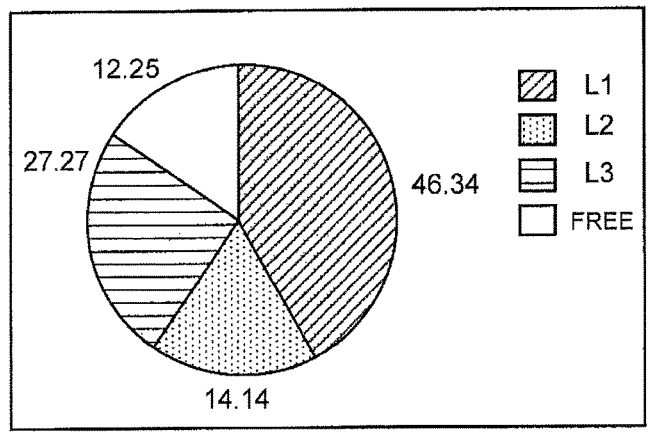

In a histogram, it is generally the case that practically all of the samples are distributed within a range of 2σ (σ is the standard deviation) centered on the average value, and there is a high possibility that a sample positioned outside the range represents some abnormality. By carrying out a display of the histogram format shown in FIG. 4A, the person in charge of testing can be caused to intuitively ascertain the presence or otherwise of an abnormality. Also, when there is a sample that deviates considerably from an envelope W of the histogram, as shown in FIG. 4A, the person in charge of testing can be caused to intuitively ascertain that the processing load may very occasionally fluctuate considerably. Also, as a result of the momentary values at each data acquisition timing being arranged in the order acquired, as shown in FIG. 4B, the person in charge of testing, when the processing load increases cyclically, can deduce the cause using the cycle in which the processing load increases as a clue. Also, when using the CPU occupation rate as an index representing the processing load of each process in the drive device 20, the ratio of the measurement result transmission request transmission interval occupied by the execution time of a process of each priority level may be calculated as the CPU occupation rate of the process, and displayed in the pie chart format shown in FIG. 4C. Herein, calculation of the CPU occupation rate may be carried out for each kind and each priority level of process, or may be carried out for each priority level, regardless of the kind of process. According to the display aspect shown in FIG. 4C, the person in charge of testing can be caused to intuitively ascertain whether or not the CPU occupation rate of each process comes within an assumed range. "Free time" in FIG. 4C is a value obtained by subtracting from the transmission interval the sum of the momentary values of the execution times of each process indicated by the measurement data, and represents the length of a period in which no process is being executed.

The above is the configuration of the testing device 10.

(A-3: Configuration of Drive Device 20)

Figure 5:
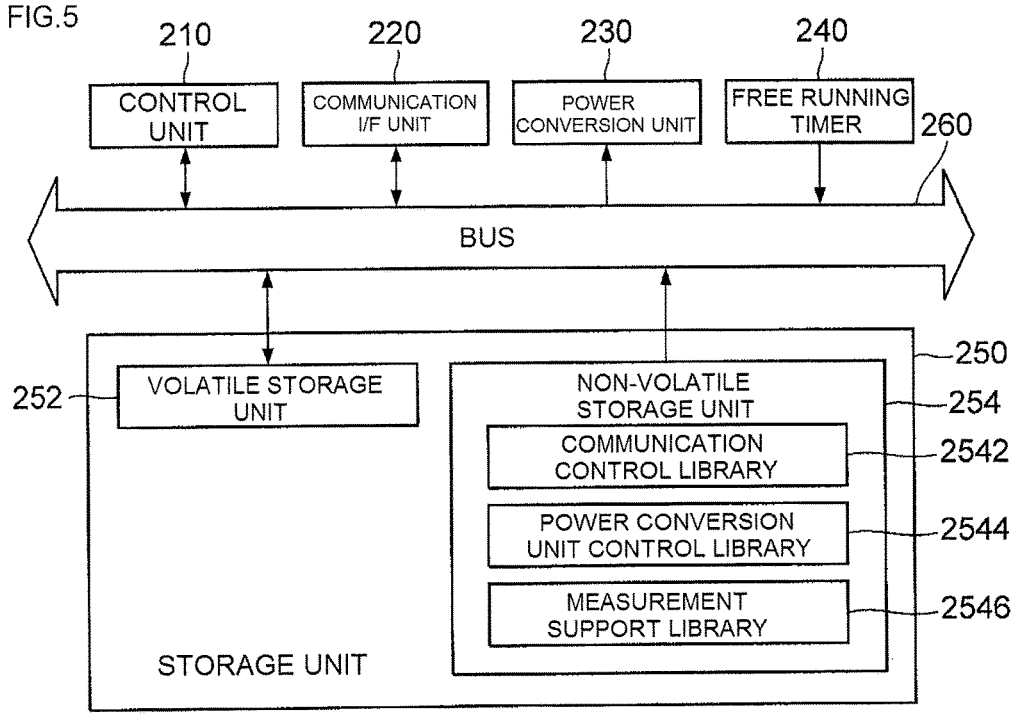
FIG. 5 is a diagram showing a configuration example of the drive device 20.

Next, while referring to FIG. 5, a description will be given of the configuration of the drive device 20. FIG. 5 is a diagram showing a configuration example of the drive device 20. The drive device 20 shown in FIG. 5 includes a control unit 210, a communication I/F unit 220, a power conversion unit 230, a free running timer 240, a storage unit 250, and a bus 260 that mediates an exchange of data among these components. The control unit 210 is a CPU, in the same way as the control unit 110 in the testing device 10. The control unit 210 functions as a control center of the drive device 20 by executing a program stored in the storage unit 250 (more precisely, a non-volatile storage unit 254). The communication I/F unit 220 is an NIC, in the same way as the communication I/F unit 120 in the testing device 10. The communication I/F unit 220 is connected to the communication I/F unit 120 of the testing device 10 via a communication line. The free running timer 240 is a hardware timer, in the same way as the free running timer 140 in the testing device 10. The free running timer 240 is utilized when measuring execution time using the previously mentioned stack method.

The power conversion unit 230 is connected to the previously described direct current power source and the motor 30. The power conversion unit 230 includes switching elements such as IGBTs (omitted from FIG. 5). In the embodiment, conversion into the alternating current power PW of direct current power supplied from the direct current power source is realized by switching (switching on and off) of the switching elements. The on/off control of the switching elements included in the power conversion unit 230 is carried out by the control unit 210.

The storage unit 250 includes a volatile storage unit 252 and the non-volatile storage unit 254. The volatile storage unit 252 is a RAM, in the same way as the volatile storage unit 152 in the testing device 10. The volatile storage unit 252 is utilized by the control unit 210 as a work area when executing various kinds of program. Also, the volatile storage unit 252 is also utilized as a stack when carrying out measurement of execution time using the stack method, and furthermore, is also utilized for storing data representing the execution times of various kinds of process for controlling the motor 30 executed in accordance with the control program. The non-volatile storage unit 254 is a non-volatile memory whose data are rewritable, such as, for example, a FLASH ROM (Flash Read-Only Memory). As shown in FIG. 5, software libraries (a communication control library 2542, a power conversion unit control library 2544, and a measurement support library 2546) that fulfill the role of the previously described control program are stored in advance in the non-volatile storage unit 254.

The communication control library 2542 is a collection of programs for causing the control unit 210 to realize a process of communicating with the testing device 10 (that is, reception of the various kinds of command M and transmission of the various kinds of data D). The power conversion unit control library 2544 is a collection of programs for causing the control unit 210 to execute a process of carrying out operation control of the power conversion unit 230 in accordance with the various kinds of command M provided from the testing device 10. The communication control library 2542 is compiled by a maker, or the like, that manufactures an electric automobile incorporating the drive device 20 in accordance with the specifications of a vehicle-mounted network mounted in the electric automobile. That is, each program included in the communication control library 2542 is a program that causes the control unit 210 to function as a customized unit customized as appropriate for each vehicle-mounted network of the electric automobile in which the drive device 20 is mounted. As opposed to this, the power conversion unit control library 2544 is compiled by the manufacturer of the drive device 200. Each program included in the power conversion unit control library 2544 is a program that causes the control unit 210 to function as a core unit that realizes operation control of the power conversion unit 230.

Processes executed by the control unit 210 in accordance with programs included in the communication control library 2542 or power conversion unit control library 2544 are broadly divided into the previously mentioned fixed-cycle processes and irregular processes. In the embodiment, interrupts instructing a start of execution of the processes occur at short time intervals of several tens of microseconds. Priority levels are set in advance for the processes, with the priority levels of the fixed-cycle processes being set the lowest. When an interrupt instructing the execution of a process of a priority level higher than that of the process being executed occurs while one of the irregular processes or fixed-cycle processes is being executed, the control unit 210 interrupts the process being executed, and executes the process of the higher priority level. Then, when the execution of the process of the higher priority level is completed, the control unit 210 restarts the execution of the process whose execution has been interrupted.

Programs included in the measurement support library 2546 are programs for causing the control unit 210 to execute a measurement process of measuring the execution time of a process executed in accordance with a program included in the communication control library 2542 or power conversion unit control library 2544, and a measurement result transmission process of notifying the testing device 10 of the result of the measurement. In the embodiment, a process executed in accordance with a program included in the communication control library 2542 or power conversion unit control library 2544 is taken to be a target of execution time measurement, but an aspect wherein only a process executed in accordance with the former is taken to be a target of execution time measurement may also be adopted. This is because the communication control library 2542 is software developed by the manufacturer of a vehicle in which the drive device 20 and motor 30 are mounted, as previously described, and it is extremely important for the manufacturer of the vehicle to verify whether or not the execution time of each program included in the communication control library 2542 comes within a pre-specified time (a time recommended by the manufacturer of the drive device 20 from the point of view of guaranteeing normal operation of the drive device 20, or a time specified in accordance with the required specifications or the like) (in other words, whether or not the processing load of each process comes within an assumed range).

Firstly, a description will be given of a program that causes the control unit 210 to realize a measurement process.

A program that causes the control unit 210 to execute a measurement process is mounted so as to be callable as a so-called API (Application Programming Interface) from each program included in the communication control library 2542 or power conversion unit control library 2544. For example, in order to measure the execution time of a certain process, a code for calling an API (hereafter, a measurement start API) instructing the execution of a measurement start process for starting the measurement of the execution time is embedded in the head of the program that causes the control unit 210 to execute the process. Meanwhile, a code for calling an API (hereafter, a measurement end API) instructing the execution of a measurement end process for ending the measurement of the execution time is embedded in the end of the program. By so doing, the control unit 210, firstly, executes a measurement start process with the occurrence of an interrupt for starting the execution of the process whose execution time is the measurement target as a trigger, and executes a measurement end process with the end of the execution of the measurement target process as a trigger.

The measurement start process, as heretofore described, is a process executed in advance of the start of the execution of the process whose execution time is the measurement target. The measurement start process is such that the control unit 210, firstly, reads in a timer value of the free running timer 240. Next, the control unit 210 determines whether or not there is another process whose execution will be interrupted by the process following the measurement start process (that is, the process whose execution time is the measurement target), and when there is no other process, the control unit 210 inverts the sign of the timer value read in, and pushes the timer value into a stack provided in the volatile storage unit 252. Herein, it is sufficient that the control unit 210 determines whether or not there is another process whose execution will be interrupted by the process following the measurement start process based on whether or not a timer value is stored in the stack. Specifically, when a timer value is stored in the stack, the control unit 210 determines that there is another process whose execution will be interrupted. Also, the sign of the timer value read in is inverted and the timer value pushed into the stack for the same reason as that of the technology disclosed in JP-A-2003-288237 (US 2003/187612).

When there is another process whose execution will be interrupted, the control unit 210 calculates a value that is a pre-specified first correction value subtracted from the difference between the timer value of the free running timer 240 and the timer value stored in the uppermost level of the stack as a value representing the execution time thus far of the other process, and after updating the contents stored in the uppermost level of the stack with the value, inverts the sign of the timer value read in, and pushes the timer value into the stack. That is, the drive device 20 of the embodiment is such that the stack also fulfills a role as a storage device that stores a value indicating the execution time thus far of a process whose execution is interrupted by an interrupt by a process of a higher priority level. Details of the first correction value will be clarified hereafter.

The measurement end process is a process executed with the end of the execution of the process whose execution time is the measurement target as a trigger. The measurement end process is such that the control unit 210 reads in a timer value of the free running timer 240, subtracts a pre-specified second correction value from the difference between the timer value and the tinier value stored in the uppermost level of the stack, and calculates the execution time of a process ending the execution in a period indicated by the two timer values. When a value indicating the execution time before this period of the period whose execution time is the measurement target is stored in the volatile storage unit 252 (although the details will be clarified hereafter, this refers in the embodiment to the uppermost level of the stack), the control unit 210 calculates the execution time of the process ending the execution by adding the value to the result of the subtraction. Details of the second correction value will be clarified hereafter.

In the measurement end process, the control unit 210 writes the execution time calculated in accordance with the heretofore described procedure into the measurement data (refer to FIG. 3) momentary value field for each kind of process that is a caller of the measurement end process (for example, whether the process is a process of the customized unit or a process of the core unit) and each priority level (that is, interrupt level) of the caller of the measurement end process. The control unit 210 compares the execution time written into the momentary value field and the stored contents of the maximum value field, updates the contents stored in the maximum value field with the execution time when the former is larger, and writes operational state data (for example, the command values and current values of torque and revolution speed, the stored contents of an internal register of the control unit 210, and the like) representing the operational state of the drive device 20 at that point into an operational state data field.

The first correction value, as shown in FIG. 6, is a value in accordance with the sum of a first required time Ta1, from the occurrence of an interrupt instructing the start of execution of the process whose execution time is the measurement target to the reading in of a timer value in a measurement start process MS, and a second required time Ta2 from the reading in of a timer value in a measurement end process ME to the end of the interrupt. In the example shown in FIG. 6, reference sign WH preceding the measurement start process MS and reference sign WH following the measurement end process ME represent interrupt handlers. Meanwhile, the second correction value is a value in accordance with the sum of a third required time Tc1e, from the reading in of the timer value in the measurement start process to the completion of the execution of the measurement start process, and a fourth required time Tc2s from the start of the execution of the measurement end process to the reading in of the timer value in the measurement end process.

It is sufficient that specific values of the first and second correction values are specified in accordance with the kind and specifications of the control unit 210, and furthermore, it is sufficient that the first correction value (the first time Ta1 and second time Ta2) is specified as a value in accordance with the priority level of the process whose execution time is the measurement target. This is in order to accurately measure the execution times of processes of differing priority levels. In the embodiment, Ta1 is specified as 34 microseconds and Ta2 as 54 microseconds for processes of the highest priority level, while Ta1 is specified as 60 microseconds and Ta2 as 78 microseconds for other processes. Also, with regard to the second correction value (the third time Tc1e and fourth time Tc2s), Tc1e is specified as 52 microseconds and Tc2s as 24 microseconds. In the embodiment, the first correction value is embedded in advance correlated to the priority level in the measurement start process program, and the second correction value is embedded in advance in the measurement end process program.

The above are the details of the program causing the control unit 210 to realize the measurement process.

Next, a description will be given of a program that causes the control unit 210 to realize a measurement result transmission process.

This program is executed with the reception of a measurement result transmission request from the testing device 10 as a trigger. A measurement result transmission process executed in accordance with the program is such that the control unit 210, as well as reading the measurement data from the volatile storage unit 252 and returning the measurement data to the testing device 10, initializes the measurement data (sets NULL (0x00) in each field of the measurement data).

The above is the configuration of the drive device 20.

(B: Operations)

Hereafter, a description will be given of operations among the operations executed by the testing device 10 and drive device 20 that markedly manifest the characteristics of the embodiment. In the operational examples described hereafter, it is assumed that the control unit 210 executes n (n is a positive integer equal to or greater than 2) kinds of process SLx (x=1 to n) in accordance with each program included in the communication control library 2542 and power conversion unit control library 2544, and that the lower the value of x, the higher a priority level Lx is set. Furthermore, all of the measurement data of the drive device 20 is initialized into NULL. Hereafter, firstly, a description will be given of the process details of the measurement start process and measurement end process, taking as an example a case wherein the execution of a process SL1 is started by an interrupt during the execution of a process SL2 under these kinds of condition. The operational example described hereafter is such that no other process is being executed at the point at which the process SL2 starts, and a code for calling up the measurement start API is embedded in the head, and a code for calling up the measurement end API embedded in the end, of each program (programs included in the communication control library 2542) that causes the control unit 210 to execute each of the processes SLx (x=1 to n). Also, when calling up the measurement start API and measurement end API, an identifier indicating whether the caller is a core unit program or a customized unit program, and a value representing the priority level of a process realized in accordance with the program, are used as parameters of the API. This is because the size of the first correction value is caused to differ in accordance with the priority level of the caller process, and measurement data are generated by categorizing the execution time measurement results into kinds of program and priority levels.

No other process is being executed at the point at which an interrupt instructing the start of execution of the process SL2 occurs. Therefore, as shown in FIG. 6, the measurement start process MS executed in advance of the execution of the process SL2 is such that the control unit 210 reads in a timer value T1 of the free running timer 240, inverts the sign of the timer value T1, and pushes the timer value T1 into the stack. Subsequently, the control unit 210 starts the execution of the process SL2, and interrupts the execution of the process SL2 when an interrupt instructing the start of execution of the process SL1 occurs. The control unit 210 reads the program whose execution is instructed by the interrupt from the non-volatile storage unit 254 into the volatile storage unit 252, and starts the execution thereof. As previously mentioned, the measurement start API is also included in the head of the program, because of which the control unit 210 firstly executes the measurement start process MS.

The measurement start process MS preceding the process SL1 is such that the control unit 210, firstly, reads in a timer value T2 of the free running timer 240. The operational example is such that, as there is a process whose execution is interrupted by the process SL1, the control unit 210, by adding the value (−T1) stored in the uppermost level of the stack to the timer value T2, and furthermore, based on the first correction value, calculates Tα'=T2−T1−Ta2−Ta1 as a value representing the execution time until the interrupt occurs of the process whose execution is interrupted. Next, the control unit 210 updates the stored contents of the uppermost level of the stack to the value Tα', and subsequently inverts the sign of the timer value T2 read in from the free running timer 240, and pushes the timer value T2 into the stack (refer to FIG. 6). When carrying out pushing of the timer value into the stack without inverting the sign, it is sufficient to cause the control unit 210 to execute a process of calculating the value Tα' by calculating the difference between the timer value T2 of the free running timer 240 and the timer value T1 stored in the uppermost level of the stack, and furthermore, subtracting the first correction value.

What should be noted here is that an actual execution time Tα of the process SL2 until the interrupt occurs (Tα=T2−T1−Tc1e−Ta1, as shown in FIG. 6) differs slightly from the value Tα' calculated using the heretofore described procedure. Although the actual execution time Tα of the process SL2 and the value Tα' calculated in the measurement start process MS differ slightly in this way, the difference between the two is corrected in the measurement end process ME following the process SL2, because of which no particular problem occurs. This point will be described in detail hereafter. When causing another storage device differing from the stack to fulfill the role of storing a value indicating the execution time thus far of a process whose execution is interrupted by an interrupt by a process of a higher priority level, it is sufficient to cause the control unit 210 to execute a process of pulling the value of the uppermost level of the stack in the measurement start process MS preceding the process SL1, calculating the value Tα' from the value and the timer value of the free running timer 240, and after storing the value Tα' in the storage device correlated to the process SL2, inverting the sign of the timer value, and pushing the timer value into the stack.

The control unit 210 that starts the execution of the process SL1 in accordance with the heretofore described procedure executes the measurement end process ME with the end of the execution of the process SL1 as a trigger. The measurement end process ME is such that the control unit 210 pulls the value stored in the uppermost level of the stack (−T2 in the embodiment), calculates the sum of the value and the timer value read in from the free running timer 240 (in this operational example, the difference between the timer value held in the uppermost level of the stack and the timer value read in from the free running timer 240), and furthermore, subtracts the second correction value from the result of the calculation. By so doing, in this operational example, a value Tx (Tx=T3−T2−Tc1e−Tc2s) representing the execution time of the process SL1 is calculated. The control unit 210 writes the process SL1 execution time Tx calculated in this way into the momentary value field of the measurement result data (refer to FIG. 3), correlated to the process SL1. As previously mentioned, the measurement result data are initialized at the point at which this operational example starts, because of which the measurement value Tx is stored as the maximum value of the process SL1 execution time, and each item of operational state measurement data at that point is stored in the operational state data field of the measurement result data. The measurement value Tx stored in the momentary value field and maximum value field of the measurement result data in this way coincides with the actual execution time of the process SL1, as shown in FIG. 6.

Next, the control unit 210 updates the stored contents of the uppermost level of the stack (Tα' in this operational example) to a value obtained by subtracting the timer value T3 read in from the free running timer 240 (−T3+Tα' in this operational example), and ends the measurement end process ME. When causing another storage device differing from the stack to fulfill the role of storing a value indicating the execution time thus far of a process whose execution is interrupted by an interrupt by a process of a higher priority level, it is sufficient to cause the control unit 210 to execute a process of pulling the value of the uppermost level of the stack in the measurement end process ME and, after calculating the measurement value Tx of the execution time of the process SL1 from the value and the timer value of the free running timer 240 and writing the value Tx into the appropriate field of the measurement data, inverting the sign of the timer value, and pushing the timer value into the stack.

As shown in FIG. 6, when the interrupt by the process SL1 ends, the control unit 210 restarts the execution of the process SL2. However, in this operational example, an interrupt instructing a start of the execution of the process SL1 occurs again, because of which the execution of the process SL2 is interrupted again. As shown in FIG. 6, the measurement start process MS triggered by the recurring interrupt is such that the control unit 210 reads in a timer value T2' of the free running timer 240, calculates a value Tα'+Tγ' (note that Tγ'=T2'−T3−Ta2−Ta1) representing the execution time of the process SL2 until the occurrence of the interrupt based on the timer value T2' and the stored contents of the uppermost level of the stack (−T3+Tα'), and updates the stored contents of the uppermost level of the stack with the value Tα'+Tγ'. Subsequently, the control unit 210 inverts the sign of the timer value T2' read in from the free running timer 240, and pushes the timer value T2' into the stack. An actual execution time Tγ of the process SL2 until the occurrence of the interrupt coincides with the value Tγ' calculated in accordance with the heretofore described procedure, as shown in FIG. 6.

Thereafter, the measurement end process ME being executed with the end of the execution of the process SL1 as a trigger, the execution time Ty (Ty=T3'−T2'−Tc1e−Tc2s) of the process SL1 being calculated and stored in the momentary value field of the measurement data in the measurement end process ME, the stored contents of the uppermost level of the stack being updated to $(-T3'+T\alpha'+T\gamma')$ after the measurement value Ty is output, and the measurement value Ty calculated in accordance with the heretofore described procedure coinciding with the actual execution time of the process SL1, are the same as in the case of the previously described first execution of the process SL1. The measurement end process of the second process SL1 is such that, when the measurement value Ty is equal to or greater than the previous measurement value Tx, the stored contents of the maximum value field are updated to the measurement value Ty in addition to the momentary value field being updated, and furthermore, a process of storing the operational state data in the appropriate field of the measurement data is executed, and when the measurement value Ty is smaller than the previous measurement value Tx, only the update of the momentary value field is executed.

When the interrupt by the process SL1 ends, the control unit 210 restarts the execution of the process SL2 again, and when the execution of the process SL2 ends, the control unit 210 executes the measurement end process ME. The measurement end process ME is such that the control unit 210 calculates a value $T\alpha'+T\gamma'+T\beta'$ (note that $T\beta'=T4-T3'-Tc1e-Tc2s$) representing the execution time of the process SL2 thus far from the stored contents of the uppermost level of the stack $(T\alpha'+T\gamma'-T3')$ and a timer value T4 read in from the free running timer 240. Then, the control unit 210 writes the measurement value $(T\alpha'+T\gamma'+T\beta')$ calculated in accordance with the heretofore described procedure into the appropriate field of the measurement data as data representing the momentary value of the process SL2 execution time. Also, as data representing an initial value are stored in the process SL2 execution time maximum value field in the measurement data at this point, the control unit 210 writes the measurement value $(T\alpha'+T\gamma'+T\beta')$ into the maximum value field, and writes the operational state data at that point into the appropriate field of the measurement data.

As is clear from referring to FIG. 6, an actual execution time Tβ ($T\beta=T4-T3'-Ta2-Tc2s$, as shown in FIG. 6) until the execution of the process SL2 is completed after the end of the interrupt by the second process SL1, and the value Tβ' calculated in accordance with the heretofore described procedure, differ slightly. However, the difference between Tβ and Tβ' ($T\beta-T\beta'$) is $-Ta2+Tc1s$, and is cancelled out by the difference $Ta2-Tc1s$ between Tα and Tα'. That is, $T\alpha'+T\gamma'+T\beta'=T\alpha+T\gamma+T\beta$, and the process SL2 execution time is calculated accurately. When causing another storage device differing from the stack to fulfill the role of storing a value indicating the execution time thus far of a process whose execution is interrupted by an interrupt by a process of a higher priority level, only -T3' is stored in the uppermost level of the stack, because of which it is sufficient to cause the control unit 210 to execute a process of calculating the value Tβ' by subtracting the second correction value from the sum of the value and the timer value T4 read in from the free running timer 240, and calculating a value representing the process SL2 execution time by adding Tα' and Tγ' stored in the storage device.

As heretofore described, the stored contents of the momentary value field of the measurement data of the drive device 20 are updated every time the execution of a process of the processes SLn (n=1 or 2) ends, and the stored contents of the maximum value field and operational state data field are updated every time the momentary value exceeds the maximum value thus far. Further, when a measurement result transmission request transmitted from the testing device 10 is received via the communication I/F unit 220, the control unit 210 reads the measurement data at the point at which the request is received from the volatile storage unit 252, transmits the measurement data to the testing device 10, and initializes the measurement data.

Meanwhile, the control unit 110 of the testing device 10 executes a process of cyclically acquiring, and accumulating in the volatile storage unit 152, the momentary values and maximum values of the execution times of the processes SLn (n=1 or 2) in the drive device 20, and the operational state data at the point at which the maximum value is measured, at constant time intervals in accordance with the testing program 1542. Further, at each data acquisition timing, the control unit 110 compares thresholds pre-specified in accordance with the kinds and priority levels of the processes SLn (n=1 or 2) and the momentary value (or maximum value) of the execution time at the data acquisition timing, and causes a warning message to be displayed in the display unit of the user I/F unit 130 when, for example, the latter exceeds the former. Also, the person in charge of testing causes the control unit 110 to execute the statistic analysis process 1542c, with a sufficient amount of measurement data being accumulated in the volatile storage unit 152 of the testing device 10 as a trigger, and can carry out multifaceted analysis of whether or not there is a problem in the processing load of each process in the drive device 20.

According to the embodiment, as the warning process is executed in this way, the person in charge of testing can ascertain the occurrence of an abnormality without carrying out a detailed examination of every item of data acquired from the drive device 20. Also, in the embodiment, in addition to the momentary values of the execution times of the processes SLn (n=1 or 2) in the drive device 20, the maximum value of the execution time in the time interval from the previous data acquisition timing to the current data acquisition timing is also acquired, because of which, compared with an aspect wherein only the momentary value is acquired, there is less occurrence of overlooking an abnormality caused by failing to acquire the maximum value. Furthermore, according to the embodiment, the operational state data at the point at which the maximum value is measured are also acquired, which can be of use in investigating the cause of the abnormality.

In addition, according to the embodiment, the momentary values and maximum values of the execution times of the processes SLn (n=1 or 2) at each data acquisition timing, and the operational state data at the point at which the maximum value is measured, are accumulated in the volatile storage unit 152 of the testing device 10, because of which there is no need to increase the capacity of the storage unit 250 of the drive device 20.

As heretofore described, according to the embodiment, a problem in the execution time of the processes can be reliably and easily ascertained without increasing the capacity of the memory of the drive device 20, which executes various kinds of process by interruption.

(C: Changes)

Heretofore, a description has been given of an embodiment of the invention, but the following are some of the changes that may be added to the embodiment.

(1) In the embodiment, a description has been given of a case of monitoring the processing load of each process executed by the control unit 210 in accordance with a program carrying out operation control of the power conversion unit 230 in the drive device 20 of the motor 30. However, processes whose processing load is the target of monitoring using the monitoring method of the invention are not limited to processes executed in a drive device that carries out drive control of a motor in an electric automobile.

For example, the processing loads of processes executed in a home-use game console or portable game console may be the target of monitoring, and the processing loads of processes executed in a smartphone or in a portable computer such as a tablet computer, or of processes executed in networking equipment such as a router, may be the target of monitoring. That is, it is sufficient that the processes are processes executed by interrupts in a computer device, and that a priority level is pre-specified for each process, and the invention is particularly effective when the interrupts occur at extremely short time intervals of several tens of microseconds.

(2) In the embodiment, values specified in accordance with the kind or specifications of the control unit 210 are used as the first and second correction values, and a value in accordance with the priority level of the process whose execution time is the target of measurement is used as the first correction value, but values specified in accordance with only the kind or specifications of the control unit 210 may be used, and values specified in accordance with only the priority level of the process whose execution time is the target of measurement may be used. According to this kind of aspect, although the execution time measurement accuracy decreases in comparison with that in the embodiment, the execution time can be measured more accurately than with the existing stack method by an amount commensurate with carrying out correction using these correction values.

(3) In the embodiment, the first correction value and second correction value are embedded in each program of the measurement support library 2546, but a table in which the correction values are written may be stored in the non-volatile storage unit 254 separately from the programs, and the control unit 210 that operates in accordance with the programs may be caused to execute a process of using the correction values by reading them from the table. By storing the correction values separately from the execution time measurement program in this way, it is possible, by rewriting the table, to flexibly respond when, for example, there is a change of the control unit 210 (replacement with a higher performance unit) or a change in the interrupt level of each process.

(4) In the embodiment, a description has been given of a case wherein the size of the first correction value is caused to differ between processes of the highest priority level and other processes, but process details may be caused to differ between a measurement start process executed in advance of a process of the highest priority level and a measurement start process executed in advance of another process. Specifically, in order to prohibit an interrupt by another process during the execution of a measurement start process, it is common that an interrupt prohibition control is carried out at the start of the measurement start process, and control terminating the prohibition is carried out at the end of the measurement start process, but as it does not happen that an interrupt by another process occurs during a measurement start process executed in advance of a process of the highest priority level, the prohibition control and prohibition termination are omitted. The same also applying to a measurement end process, the prohibition control and prohibition termination may be omitted from a measurement end process following a process of the highest priority level, and the prohibition control and prohibition termination may be executed in a measurement end process following another process.

(5) In the embodiment, measurement data transmitted from the drive device 20 are accumulated in the storage unit 150 of the testing device 10, but the measurement data may be accumulated in a storage device connected to the testing device 10 via an external equipment interface such as a USB (Universal Serial Bus) interface. Also, in the embodiment, a warning message or a screen representing a result of the statistic analysis process 1542c is displayed in the display unit of the user I/F unit 130, but the warning message or screen may be displayed in a display device connected to the testing device 10 via an external equipment interface. Also, in the embodiment, a description is given of a case wherein a warning message is displayed in the display unit of the user I/F unit 130, but an audio output aspect may also of course be adopted.

(6) In the embodiment, the control unit 110 of the testing device 10 is caused to execute three kinds of process, the result collecting process 1542a, warning process 1542b, and statistic analysis process 1542c. However, the statistic analysis process 1542c may be omitted when carrying out only real time monitoring of processing load, and conversely, the warning process 1542b may be omitted when not carrying out real time monitoring of processing load. Also, in a case of carrying out a statistic analysis process using a statistic analysis-dedicated computer device when not carrying out real time monitoring of processing load, the statistic analysis process 1542c may be omitted. Also, if collection and accumulation of operational state data in the result collecting process 1542a not being essential, they may be omitted. Further, when omitting the collection and accumulation of operational state data, storage of operational state data in a measurement end process may be omitted.

Reference signs and numerals are as follows:
1 . . . Testing system
10 . . . Testing device
110, 210 . . . Control unit
120, 220 . . . Communication I/F unit
130 . . . User I/F unit
230 . . . Power conversion unit
140, 240 . . . Free running timer
150, 250 . . . Storage unit
152, 252 . . . Volatile storage unit
154, 254 . . . Non-volatile storage unit
1542 . . . Testing program
2542 . . . Communication control library
2544 . . . Power conversion unit control library
2546 . . . Measurement support library
160, 260 . . . Bus
30 . . . Motor Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of monitoring processing loads of a plurality of processes when the plurality of processes are executed by a computer device, each of the plurality of processes being executed by a respective interrupt having a priority level, being among a plurality of priority levels, specified in advance, the method being performed using a host controller that communicates with the computer device, and the method comprising:

cyclically transmitting a measurement result transmission request from the host controller to the computer device in cycles longer than a longest execution cycle among respective execution cycles of the plurality of processes;

transmitting measurement data from the computer device to the host controller every time the computer device receives the measurement result transmission request, the measurement data of each cycle of the transmitting being prepared by a process, performed by the computer device, including every time one of the plurality of processes is executed, measuring an index representing a processing load of the respective one of the plurality of processes that is executed, to thereby obtain measurement values of the index of a plurality of executed processes, each of the measurement values associated with the priority level of the respective interrupt by which the respective process was executed, and for each of the plurality of priority levels,
storing a latest measurement value, being among the measurement values, associated with the priority level, and
updating a maximum value, of the index, associated with the priority level with the latest measurement value when the latest measurement value exceeds the maximum value measured prior to the updating,
the latest measurement value and the maximum value associated with each of the priority levels thereby being obtained and included in the measurement data for the cycle of the transmitting; and accumulating, across multiple cycles of the transmitting measurement data, the latest measurement values and the maximum values transmitted from the computer device in a storage device.

2. The monitoring method according to claim 1, further comprising, by using the host controller:
storing a threshold value relating to the index specified in accordance with the priority level for each of the plurality of processes, and
executing a process of comparing the latest measurement value received from the computer device to the relevant threshold value, causing an output device to output a warning message in accordance with the comparison result.

3. The monitoring method according to claim 1, further comprising:
having the computer device store operational state data indicating an operational state of the computer device at a time when updating the maximum value,
with reception of the measurement result transmission request as a trigger, transmitting the operational state data correlated to the maximum value together with the latest measurement value and maximum value from the computer device to the host controller, and
storing, using the host controller, the latest measurement values, maximum values, and operational state data received from the computer device in the storage device.

4. The monitoring method according to claim 2, further comprising:
having the computer device store operational state data indicating an operational state of the computer at a time when updating the maximum value,
with reception of the measurement result transmission request as a trigger, transmitting the operational state data correlated to the maximum value together with the latest measurement value and maximum value from the computer device to the host controller, and
storing, using the host controller, the latest measurement value, maximum value, and operational state data received from the computer device in the storage device.

5. The monitoring method according to claim 1, wherein the index is an execution time or a CPU occupation rate of each of the plurality of processes.

6. The monitoring method according to claim 2, wherein the index is an execution time or a CPU occupation rate of each of the plurality of processes.

7. The monitoring method according to claim 3, wherein the index is an execution time or a CPU occupation rate of each of the plurality of processes.

8. The monitoring method according to claim 4, wherein the index is an execution time or a CPU occupation rate of each of the plurality of processes.

9. The monitoring method according to claim 5, wherein the index is an execution time of each of the plurality of processes, and the computer device calculates the measurement value for each process by subtracting the time needed to measure the index.

10. The monitoring method according to claim 6, wherein the index is an execution time of each of the plurality of processes, and the computer device calculates the measurement value for each process by subtracting the time needed to measure the index.

11. The monitoring method according to claim 7, wherein the index is an execution time of each of the plurality of processes, and the computer device calculates the measurement value for each process by subtracting the time needed to measure the index.

12. The monitoring method according to claim 8, wherein the index is an execution time of each of the plurality of processes, and the computer device calculates the measurement value for each process by subtracting the time needed to measure the index.

13. A method of monitoring processing loads of a plurality of processes when the plurality of processes are executed by a computer device, each of the plurality of processes being executed by a respective interrupt having a priority level, being among a plurality of priority levels, specified in advance, the method being performed using a host controller that communicates with the computer device, and the method comprising:
every time one of the plurality of processes is executed, measuring, using the computer device, an index representing a processing load of the respective one of the plurality of processes that is executed, to thereby obtain measurement values of the index respectively of a plurality of executed processes, each of the measurement values associated with the priority level of the respective interrupt by which the respective process was executed;
for each of the plurality of priority levels,
storing, using the computer device, a latest measurement value, being among the measurement values, associated with the priority level, and
updating, using the computer device, a maximum value, of the index, associated with the respective priority level with the latest measurement value when the latest measurement value exceeds the maximum value measured prior to the updating;
transmitting a measurement result transmission request from the host controller to the computer device;
when the computer device receives the measurement result transmission request, transmitting the latest measurement values and the maximum values associated with each of the priority levels from the computer device to the host controller; and storing the latest measurement values and the maximum values transmitted from the computer device in a storage device.

14. The monitoring method according to claim 13, further comprising, by using the host controller:
storing a threshold value relating to the index specified in accordance with the priority level for each of the plurality of processes, and
executing a process of comparing the latest measurement value received from the computer device to the relevant threshold value, causing an output device to output a warning message in accordance with the comparison result.

15. The monitoring method according to claim 14, further comprising:
having the computer device store operational state data indicating an operational state of the computer at a time when updating the maximum value,
with reception of the measurement result transmission request as a trigger, transmitting the operational state data correlated to the maximum value together with the latest measurement value and maximum value from the computer device to the host controller, and
storing, using the host controller, the latest measurement values, the maximum values, and operational state data received from the computer device in the storage device.

16. The monitoring method according to claim 15, wherein the index is the execution time or CPU occupation rate of each of the plurality of processes.

17. The monitoring method according to claim 16, the index is an execution time of each of the plurality of processes, and the computer device calculates the measurement value for each process by subtracting the time needed to measure the index.

18. The monitoring method according to claim 13, wherein the index is the execution time or CPU occupation rate of each of the plurality of processes.

19. The monitoring method according to claim 14, the index is an execution time of each of the plurality of processes, and the computer device calculates the measurement value for each process by subtracting the time needed to measure the index.

20. A computer device, comprising:
a communication interface configured to communicate with a host controller;
a storage; and
a controller that executes a plurality of processes executed by an interrupt, each interrupt having one of a plurality of priority levels specified in advance, the controller configured to
every time one of the plurality of processes is executed, measure an index representing the processing load of the respective one of the plurality of processes that is executed, to thereby obtain measurement values of the index of a plurality of executed processes, each of the measurement values associated with the priority level of the respective interrupt by which the respective process was executed, and
for each of the plurality of priority levels,
write a latest measurement value, being among the measurement values, associated with the priority level into the storage, and
update a maximum value, of the index, associated with the priority level with the latest measurement value when the latest measurement value exceeds the maximum value prior to the update,
read the latest measurement value and maximum value from the storage upon receiving, via the communication interface, a measurement result transmission request from the host controller requesting transmission of the latest measurement value, and
transmit the latest measurement value and maximum value to the host controller.

* * * * *